United States Patent
Curran et al.

(10) Patent No.: US 6,708,175 B2
(45) Date of Patent: Mar. 16, 2004

(54) PROGRAM SUPPORT FOR DISK FENCING IN A SHARED DISK PARALLEL FILE SYSTEM ACROSS STORAGE AREA NETWORK

(75) Inventors: Robert J. Curran, West Hurley, NY (US); Kuei-Yu Wang-Knop, Poughkeepsie, NY (US); Frank B. Schmuck, Campbell, CA (US)

(73) Assignee: International Business Machines Corporation, Armonk, NY (US)

(*) Notice: Subject to any disclaimer, the term of this patent is extended or adjusted under 35 U.S.C. 154(b) by 455 days.

(21) Appl. No.: 09/875,099

(22) Filed: Jun. 6, 2001

(65) Prior Publication Data

US 2002/0188590 A1 Dec. 12, 2002

(51) Int. Cl.[7] .............................................. G06F 17/30
(52) U.S. Cl. ................................. 707/10; 707/1; 707/2; 707/9
(58) Field of Search ...................... 707/1–10, 200–202, 707/104.1; 709/321, 328, 229, 310

(56) References Cited

U.S. PATENT DOCUMENTS

| | | | | |
|---|---|---|---|---|
| 4,879,716 A | 11/1989 | McNally et al. | ............ | 710/316 |
| 5,036,455 A | 7/1991 | Atwood | ........................ | 714/22 |
| 5,253,184 A | 10/1993 | Kleinschnitz | ............... | 702/184 |
| 5,293,556 A | 3/1994 | Hill et al. | .................... | 702/184 |
| 5,404,503 A | 4/1995 | Hill et al. | ..................... | 714/31 |
| 5,568,491 A | 10/1996 | Beal et al. | ................... | 714/746 |
| 5,675,724 A | 10/1997 | Beal et al. | ..................... | 714/4 |
| 5,812,748 A | 9/1998 | Ohran et al. | .................... | 714/4 |
| 5,893,086 A | 4/1999 | Schmuck et al. | ............... | 707/1 |
| 5,940,838 A | 8/1999 | Schmuck et al. | ............ | 707/200 |
| 5,940,841 A | 8/1999 | Schmuck et al. | ............ | 707/205 |
| 5,946,686 A | 8/1999 | Schmuck et al. | .............. | 707/10 |
| 5,950,199 A | 9/1999 | Schmuck et al. | ............... | 707/8 |
| 5,956,734 A | 9/1999 | Schmuck et al. | ............ | 707/205 |
| 5,960,446 A | 9/1999 | Schmuck et al. | ............ | 707/205 |
| 5,963,963 A | 10/1999 | Schmuck et al. | ............ | 707/205 |
| 5,974,424 A | 10/1999 | Schmuck et al. | ............ | 707/201 |
| 5,987,477 A | 11/1999 | Schmuck et al. | ............ | 707/201 |
| 6,021,508 A | 2/2000 | Schmuck et al. | ............... | 714/4 |
| 6,032,216 A | 2/2000 | Schmuck et al. | ........... | 710/200 |
| 6,192,443 B1 | 2/2001 | Mendel | ......................... | 711/1 |
| 6,192,483 B1 | 2/2001 | Moiin et al. | .................... | 714/4 |
| 6,195,754 B1 | 2/2001 | Jardine et al. | .............. | 713/324 |
| 6,243,814 B1 * | 6/2001 | Matena | ........................ | 713/200 |
| 6,275,867 B1 * | 8/2001 | Bendert et al. | ............. | 709/316 |
| 6,401,120 B1 * | 6/2002 | Gamache et al. | ........... | 709/226 |
| 6,438,705 B1 * | 8/2002 | Chao et al. | ..................... | 714/4 |
| 6,487,622 B1 * | 11/2002 | Coskrey et al. | ............. | 710/241 |

* cited by examiner

Primary Examiner—Greta Robinson
Assistant Examiner—Linh Black
(74) Attorney, Agent, or Firm—Lawrence D. Cutter

(57) ABSTRACT

A method is provided for limiting access to disks and files in the event of a system partitioning occurring as the result of a node failure in a data distributed processing system in which files are shared amongst a plurality of independently running nodes. The nodes in the system are provided with limited duration leases which permit data access and which have to be periodically renewed. Each partition is also associated with a quorum which is also a necessary element in providing access at proper times. The lease and quorum concepts work together to insure that recovery operations do not occur until recovery is possible. The lease concept thus is also seen as further operating in close cooperation with the quorum concept to prevent long delays in the recovery process that could otherwise occur.

8 Claims, 3 Drawing Sheets

PROGRAM SUPPORT FOR DISK FENCING IN A SHARED DISK PARALLEL FILE SYSTEM ACROSS STORAGE AREA NETWORK

BACKGROUND OF THE INVENTION

The present invention is generally directed to a system and method for controlling access to one or more files in a storage area network, or similar system, which are to be accessed from a number of independent processor nodes. More particularly, the present invention is directed to a method for limiting access to files for a relatively short duration when node failures occur, one of the consequences of node failure being the partitioning of the nodes into a plurality of partitions. Even more particularly, the method of the present invention responds to a division of the nodes into a plurality of distinct group of nodes (partition), each of which is subsequently associated with a quorum value, so as provide a process which insures the continued presence of reliable agreement on the grant of access to one or more of the files and/or disk drives attached to the system in a shared file structure. The duration of the access limitation is controlled, at least in part, through the utilization by each node of time limited access grants which are periodically renewed, but which are still required to be active (unexpired) for file access. This limited time access, referred to herein as a lease mechanism, is granted by a lease manager running on one of the nodes. Logging operations that have occurred prior to node failure are used in a recovery process to provide continuing operations without data corruption. In the present invention, operations are permitted to continue even in the event that there is a failure of the node on which the lease manager is running. Furthermore, the present invention prohibits access for as small a time as is reasonably practical.

A proper understanding of the operation of the present invention is best grasped from an appreciation of the environment in which it operates. Accordingly, a description of such an environment is now provided. Further useful background information is found in U.S. Pat. No. 6,032,216 ("Parallel File System with Method Using Tokens for Locking Modes" filed Jul. 11, 1997 and assigned to the same assignee as the present application) which is hereby incorporated herein by reference.

Shared disk file systems allow concurrent access to data contained on disks attached by some form of Storage Area Network (SAN). SANs provide physical level access to the data on the disk to a number of systems. The shared disks are often split into partitions which provide a shared pool of physical storage but which do not inherently have common access. In order to provide such access a shared disk file system or database manager is required. Coherent access to all of the data from all of the processor nodes is provided by the SAN. IBM's GPFS (General Parallel File System) is a file system which manages a pool of disks and disk partitions across a number of systems. GPFS allows high speed direct access from any system and provides performance levels across a single file system which exceeds that available from any file system managed from a single processor system node.

In the GPFS shared disk file system, each node (with each node having one or more data processors) has independent access to the disks. Consistency of data and metadata (to be described more particularly below) is maintained through the use of a distributed lock manager (or token manager). A problem occurs when one of the processors fails (due to either software or to hardware problems), leading to the loss of the processor and/or to the loss of communications capability which is needed to participate in lock management (via the lock management protocol in place within the system). Therefore, a need exists for recovery mechanisms to allow all surviving processors to execute safely using the shared disks and to allow any failed processor to return to a known state. For further background information in this regard see "Parallel File System and Method for Independent Metadata Logging" (U.S. Pat. No. 6,021,508 filed Jul. 11, 1997 and assigned to the same assignee as the present application).

The recovery model described in many systems of this kind assumes the existence of the capability for blocking access from a given processor to a given disk so that the disk subsystem ceases to honor disk requests from the failed processor. The failed processor in such systems will not be able to access the shared disks (that is, it is "fenced off"), even if it has not yet detected the communication failure. Often this fencing capability is provided by the disk hardware support (for example, via the SCSI persistent reserve protocol or via the Storage System Architecture (SSA) fencing operation) but there exist disk drivers where such capability is not available. In these cases, a software method has to be provided as a mechanism for blocking failed processors from improperly accessing shared file and/or data resources. The present invention fulfills this need.

In the context of shared disk parallel file systems, the present invention is targeted at mechanisms for fencing off a failed node from accessing the shared disks. If one of the nodes fails or can no longer participate in the consistency protocol, one of the purposes of the present invention is to make sure that it will no longer write to any of the disks before log recovery for that node is initiated.

SUMMARY OF THE INVENTION

In accordance with a preferred embodiment of the present invention there is provided a method for controlling access to files in a storage area network or similar arrangement in which a plurality of data processing nodes seek access to common files stored under control of other data processing nodes. In the event of a node failure, the nodes are partitioned into a plurality of distinct groups of nodes, also referred to herein as partitions within a node set. For each partition the number of nodes that constitute a quorum is determined. The time at which node failure is reported to each partition is also noted. As long as a node has an unexpired "lease" (permission) to access a given file and no node failures have occurred file access is granted and data is either read or written, or both. Additionally, grant of access also implies the possibility of modifying metadata which is associated with the file. The grant of access is determined from within a partition in which a quorum of nodes is available and in which these nodes agree. Based upon (1) the times that node failure is reported to the different partitions, (2) the duration, D, granted for the "lease" and (3) the preferable use of a system safety margin time value, M, further access to the file from the failed node is prohibited. Put another way, the failed node is thus "fenced off" from access to the file for a time sufficient for proper recovery operations to be performed based on transaction logs that are maintained for this purpose. This assures not only that no corruption of data occurs, but that the system recovers in as little time as possible. It also provides a program solution which extends across various disk hardware platforms. It is also noted that while the method and system of the present invention is particularly described herein in terms of disk drives or DASD storage units, the invention is equally applicable to optical storage media and even to systems of tape or cartridge storage. In fact, the nature of the information storage medium is essentially irrelevant other than that it possess a file structure.

Accordingly, it is an object of the present invention to provide enhanced protection against corruption of both data and metadata in a storage area network or similar system of distributed data processing nodes.

It is also an object of the present invention to provide storage area networks which can be constructed from disk drive systems based on several different hardware protocols for data access, such as SCSI and SSA and which also includes arrays of storage devices attached via optical fiber connections, including the Fiber Channel architecture.

It is yet another object of the present invention to meld together the concepts of node leasing and node quorums across a partitioned arrangement of nodes to assure data consistency.

It is a still further object of the present invention to insure that recovery from node failure occurs as quickly as possible.

It is also an object of the present invention to provide an enhanced role and opportunity for data logging and recovery operations.

It is yet another object of the present invention to extend the capabilities of parallel file systems.

It is a still further object of the present invention to improve the operating characteristics of storage area networks in the face of node failures and partitioning operations.

It is also object of the present invention to better manage a pool of disks and disk partitions across a number of systems while still permitting high speed, direct access.

It is yet another object of the present invention to protect both data and metadata from inconsistencies arising due to node failures.

Lastly, but not limited hereto, it is object of the present invention to provide a software mechanism for blocking access from failed nodes.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
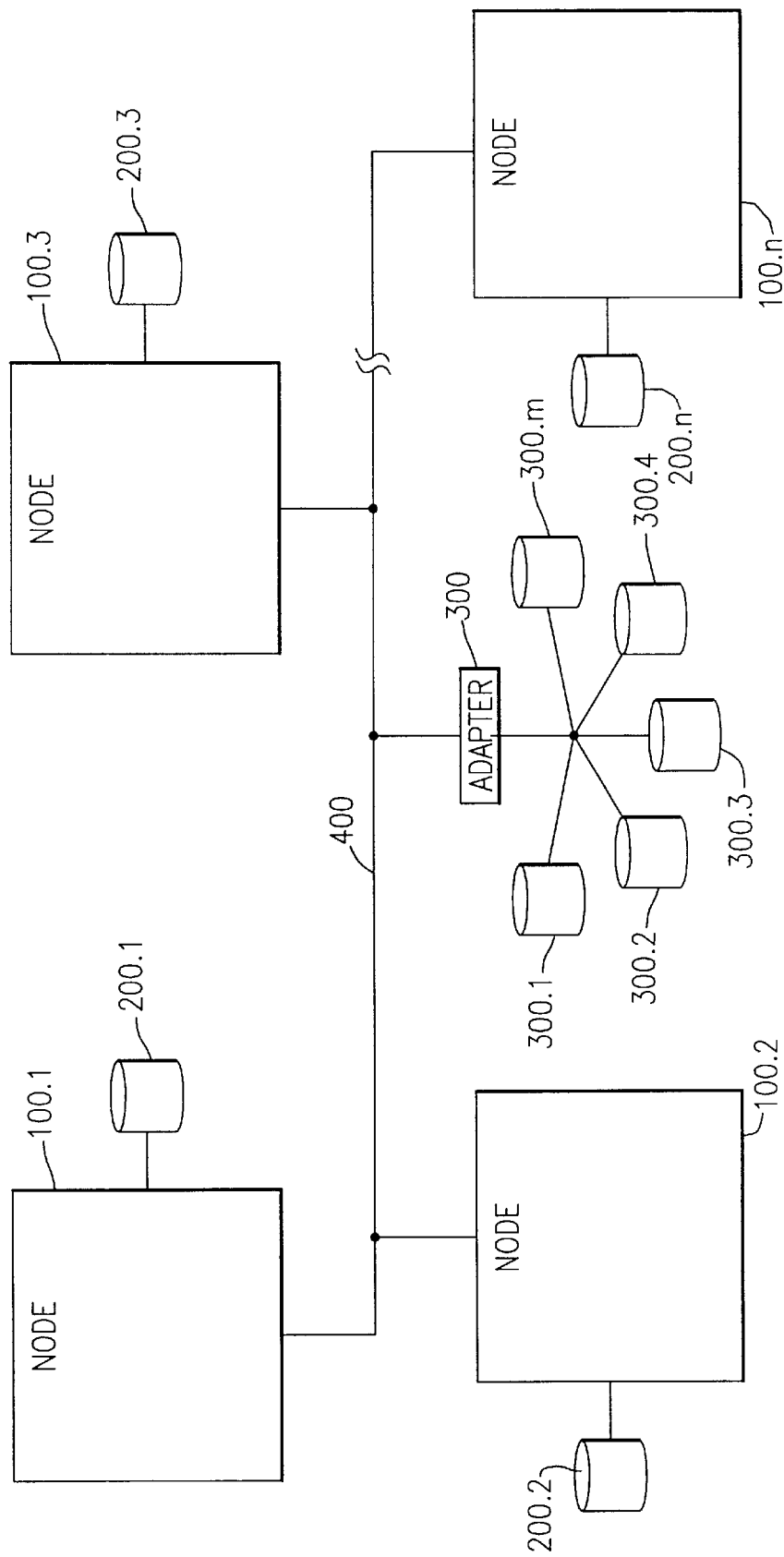
FIG. 1 is a block diagram illustrating the environment in which the present invention is employed.

FIG. 1 illustrates a typical environment in which preferred embodiments of the present invention are employed. In particular, there is shown the interconnection of nodes 100.1 through 100.n over network 400. In preferred embodiments of the present invention each node 100.i is a node within an IBM p-Series machine, with the nodes being connected through a switch and communicating with one another using the publicly defined TCP/IP (Transmission Control Protocol/Internet Protocol) messaging protocol. (While this protocol is referred to as an Internet Protocol, it should be noted that the use of this term herein does not imply the existence of any Internet connections nor does it imply dependence on the Internet in any way. It is simply the name of a conveniently used, well characterized communication protocol usable within a connected network of data processing nodes.) Each such node may, in fact, include a plurality of Central Processing Units (CPUs) some or all of which share memory with one another. Each node 100.i is preferably connected locally to a nonvolatile storage device such as a DASD (Direct Access Storage Device) unit or other similar device 200.i (with $2 \pounds i \pounds n$). These units typically comprises a rotating magnetic disk storage unit. However, the scope of the present invention includes any nonvolatile storage mechanism capable of holding data files. The number of nodes is not critical. Furthermore, not everything attached to network 400 has to be a data processing node. Relatively large collections of DASD storage devices (or similar storage devices as described above) (300.1 through 300.m ) are connected to network 400, for example, through adapter 300 which includes a p-Series processing unit dedicated for use in maintaining communications between storage array 300 (units 300.1 through 300.m) and network 400.

The discussion below provides a description of the data structures and recovery model employed in conjunction with the present invention which provides a mechanism for fencing disks without the ordinarily required hardware support for fencing in a shared disk file system environment.

The Shared Disk File System

A file system is a computer program that allows other application programs to store and retrieve data on media such as disk drives. A file is a named data object of arbitrary size. The file system allows application programs to create files, to give them names, to store data into them (or write), to read data from them, to delete data elements from them and to perform other operations on them. A file structure is the organization of data on the disk drives.

A shared disk file system is one in which a file structure residing on one or more disks is accessed by multiple file systems running on separate computers (or nodes which may include one or more data processing units). A shared disk file system is structured to allow data computations that uses the file structure to be broken up into multiple pieces that can be run in parallel on multiple nodes.

In addition to the file data itself, the file structure contains metadata: a directory that maps a file name into the corresponding files, file metadata (i-nodes and indirect blocks) that contain information about the files, most importantly being the location of the file data on disk (i.e. which disk blocks hold the file data), an allocation map that records which disk blocks are currently in use to store metadata and file data, and a superblock that contains overall information about the file structure (e.g. the locations of the directory, allocation map, and other metadata structures).

The file system preferably employed in the present invention and the one described herein is the GPFS General Parallel File System as marketed and sold by the assignee herein. GPFS allows shared access to files that span multiple disk drives on multiple SP nodes (that is, nodes within the assignee's p-Series line of server products).

Metadata Updates

Nodes read from and write to different areas of the file if they present an appropriate lock on the sections which they are reading from or writing to, but they all need to access the same metadata. The metadata includes the file size, file access and file modification times and the addresses of the file's data blocks. In GPFS there is the notion of metadata node (or metanode) that is used for managing file metadata for parallel read and write operations in a shared disk environment. For each file, a single node is selected as the metanode for that file. The metanode keeps the information about the file's metadata and is responsible for handling the I/O activity of metadata to and from the disk (or disks) on which the metadata reside. All the other nodes communicate with the metanode in order to fetch or to update metadata information. However, these nodes do not directly access metadata information on the disk, and this prevents a considerable amount of disk activity which thus provides considerable performance improvement in a parallel file systems.

Write Sharing

GPFS provides fine grained write sharing support, so that as long as two operations update disjoint byte ranges of a file, they are allowed to proceed in parallel.

Parallel File System Recovery Model

The GPFS recovery model implements the following concepts:

A group monitoring service (like the IBM RS/6000 Cluster Technology (RSCT) group services) that monitors processes on all of the processors and detects processor and communication failures. This service is provided by joining "process groups"; all members of a group are informed when a member fails or when a new process attempts to join an existing group. During process start time, each processor must join the process group so that it can be monitored by the Group Services function.

Distributed locking: all disk access is coordinated among group members through distributed locking in which one member obtains a lock before reading or changing a particular piece of data and/or metadata on a shared disk. One group member is designated as the lock manager. The lock manager knows which locks can be held on which node.

Quorum: During startup, and when there are communication failures (like a network partition), it is possible that more than one group forms. This could lead to lock managers in different groups making conflicting locking decisions. To prevent this, no file system operations are permitted if less than a majority of the processors capable of accessing the disks are a member of "process group".

Logging: All data and/or metadata updates that result in inconsistencies after a failure are logged. Each processor has its own log, but logs are stored on shared disk so they are accessible to all nodes in case of a node failure.

Fencing: This provides the capability of blocking access from a given node to a given disk.

Barriers: Since recovery steps are inherently sequential and since certain recovery steps are executed on all nodes, "barriers" are used to ensure that such steps are completed on all nodes before executing the next step anywhere.

Special Management Functions

In general, GPFS performs the same functions on all nodes. It services application requests on the node where the application exists. There are cases, however, where one node provides a more global function affecting the operation of multiple nodes. These are nodes acting as: (1) the configuration manager and (2) the file system manager.

The Configuration Manager

The Configuration Manager selects the File System Manager node and determines whether or not a quorum of nodes exists. There is one Configuration Manager per nodeset, where a nodeset is set of nodes that provide access to GPFS file systems. The oldest, continuously operating node in the nodeset, as monitored by Group Services, is automatically assigned as Configuration Manager. If it should fail for any reason, the next oldest node takes its place as Configuration Manager.

The File System Manager

There is one File System Manager per file system which services all of the nodes using that file system. Some of the services provided by the File System Manager include:

1. File system configuration
2. Management of disk space allocation
3. Token management (lock manager).

The File System Manager is selected by the Configuration Manager. If a File System Manager should fail for any reason, a new File System Manager is selected by the Configuration Manager, and all functions continue without disruption, except for the time required to accomplish the takeover.

Software Support for Disk Fencing

For file systems using disk devices that do not have a hardware fencing protocol implemented, a time-out based approach is presented herein to block failed nodes from accessing the disks.

The following scenario illustrates the functioning of the GPFS recovery model and the need for disk fence. Assume that one has a system with six nodes: $N_1, N_2, N_3, N_4, N_5$, and $N_6$. Further assume that at time T, a network partition occurred, forming two partitions: $P_1$ and $P_2$. P1 is assumed to contain the majority of the nodes (say, $N_1, N_2, N_3$ and $N_4$) and $P_2$ contains the remaining (minority number) of nodes (say, $N_5$ and $N_6$). See FIG. 3. T is the time when the network partition happened. $T_1$ is the time when $P_1$ received the failure notification from the group services system that one of the nodes in $P_2$ has failed. $T_2$ is the time when $P_2$ received the failure notification from the group services system. In general, $T<T_1$, and for this particular example, it is assumed that $T_1<T_2$, so that $T<T_1<T_2$. At $T_1$, when $P_1$ received the failure notification, it attempts to recover from the assumed failure of nodes $N_5$ and $N_6$ through the use of logs. If the log recovery (log replay) starts after $T_1$ but before $T_2$, then $P_2$ still thinks that it is up and may end up writing to the same disks being recovered and thus corrupting data. The present invention precludes this scenario.

The objective of providing disk fencing is to make sure that before log recovery can be safely attempted, the nodes being recovered are no longer allowed to perform I/O operations. If hardware fencing is available, a fence request is issued just before starting log replay. However, because there is the possibility that a hardware fencing capability is absent, the present invention employs "disk leasing" as a mechanism, which is described more particularly below, to ensure safe log recovery.

The Disk Leasing Mechanism

At GPFS start up time, each node that has access to GPFS disks is given a valid lease, that is, the permission to access all disks that are available to the GPFS. The lease is renewed periodically by a background thread. If a node holds a valid lease, it is allowed to access the disks attached locally, otherwise its disk I/O requests are blocked until obtaining a valid lease.

The Configuration Manager is responsible for giving out disk leases to each file system node. The disk lease mechanism provides the following. The lease is given to each node for a duration of D (for example, 1 minute). At each node, there is a background thread (lease thread) that requests lease renewal every Y seconds (preferably Y<D, for example Y=D/2). The lease requests sent to the Configuration Manager also represent the "heartbeats" ("I am alive" messages) of the participant nodes to the Configuration Manager.

On each node the lease is renewed periodically and the end of lease time (LeaseEndTime) is recorded. At each disk I/O request, just before passing the I/O request to the device driver in the operating system kernel, the current time is compared against the LeaseEndTime. The request is passed to the device driver only if the current time is less than LeaseEndTime. If the background lease renewal thread is not able to renew the lease (for example, if it is unable to communicate with the Configuration Manager), at most D seconds later the check on LeaseEndTime on the I/O path fails, and the device driver on the nodes without valid lease receives no more I/O requests after that time.

The background thread that renews the lease by sending requests to the Configuration Manager is not time critical: if an I/O request does not go through because the background thread was too slow to renew the lease, the request is simply retried until either the lease is renewed or until it is determined that the lease is permanently lost.

When a node has a valid lease, all of the disk I/O operations on the node are allowed to proceed. In preferred embodiments of the present invention, the background thread always tries to renew the lease before its expiration. If the lease has expired before the lease thread was able to renew it then the lease thread tries to issue the lease request more frequently for a specified number of times and then continues retrying at the normal request frequency rate until the lease is granted. This method of operation is meant to cover the situation where communication to the Configuration Manager has temporary failed or where there is a configuration manager recovery and takeover transition. In the meantime, while there is no valid lease on the node, all of the disk I/O operations are placed in a queue of pending requests for later processing.

Lease Quorum

To ensure that the node handing out leases is the true Configuration Manager (there could be a Configuration Manager node failure and a configuration manager takeover in process), the Configuration Manager, in order to distribute lease, must have valid disk lease of its own and also have the lease quorum.

The lease quorum is defined based on the past history of lease distribution. The Configuration Manager has a lease quorum if it has handed out leases to the majority of the file system nodes during the last lease period (recall that the lease renewal request frequency is preferably higher than the lease). At the beginning of each lease period, the Configuration Manager resets the bit map (one bit for each node) used for tracking the number of nodes requesting a lease. The lease is granted to a specific node for any disk attached to it through the GPFS.. The lease quorum is achieved if the number of nodes is higher than 50% at the end of the lease period. If in the past lease period the Configuration Manager did not hear from the majority of the nodes, it may signify that the Configuration Manager node belongs to a minority partition but that Group Services has not yet detected this situation, therefore the Configuration Manager is not allowed to grant leases until the lease quorum is achieved.

Failure Scenarios and Log Recovery

If one of the file system nodes fails, it no longer writes to any of the disks before log recovery is started for that node. Upon the receipt of node failure notification from Group Services, the Configuration Manager no longer honors the lease requests from the failed node and the log recovery of the failed node takes place during a time that no I/O operations are allowed to be processed from that node. In this case, it is safe to recover a failed node at a time T, such that:

$$T > T_1 + D + Y + M + W,$$

where $T_1$ is the time that failure notification is received by the configuration manager, D is the lease duration, Y is the longest disk I/O time, M represents a non-zero safety margin value which is system specific, and W is the configuration manager failure/recovery time. While this represents the preferred delay time before recovery operations are permitted to the failed node, more generally, the delay possible may be less cautiously chosen to be as little as $T + \max(T_1, \ldots, T_n) + D + M$, where there are more than two partitions.

System Partition

Figure 3:
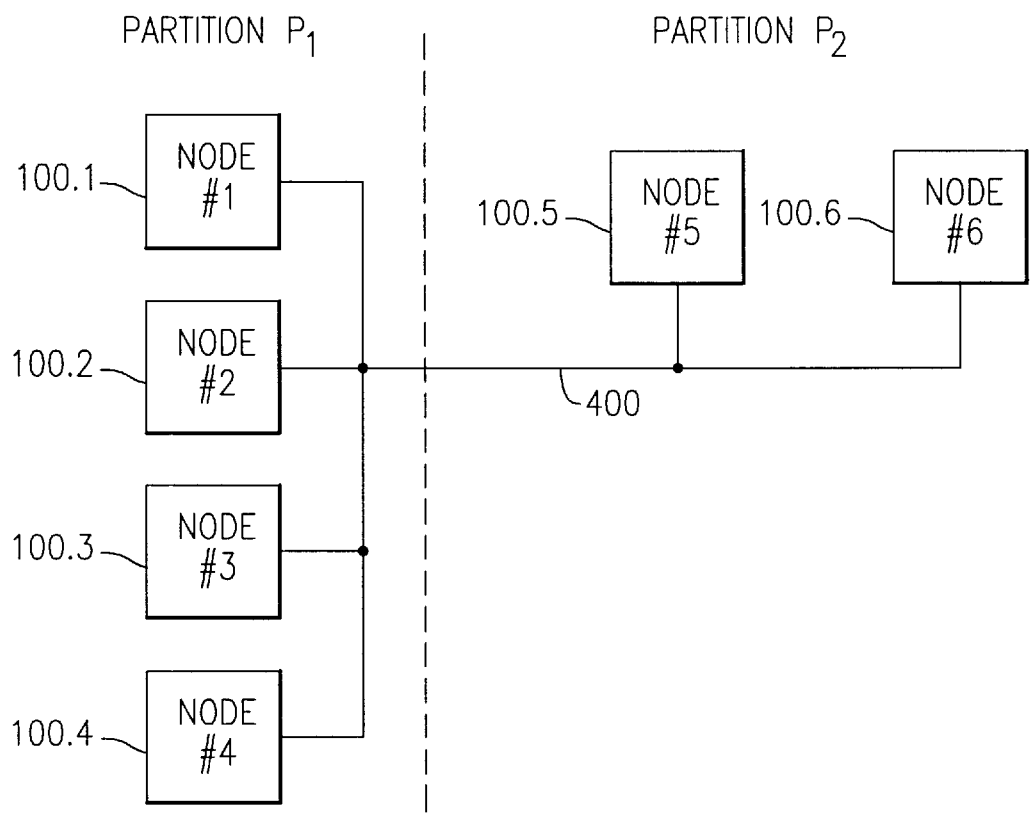
FIG. 3 is a block diagram illustrating the network partitioning of a plurality of nodes into two group of nodes which has occurred as a result of a node failure or network communication failure.

With respect to the partitioning described in FIG. 3, suppose that the Configuration Manager is node $N_5$ and that the network partition happened at time T. In a first exemplary case, further assume that the nodes in partition $P_1$ received the failure at time $T_1$ and that the nodes in partition $P_2$ received the failure notice at a later time, $T_2$, so that it is thus the case that $T < T_1 < T_2$. In this case, although node $N_5$ (the Configuration Manager node) still thinks it is functioning, there is in fact a configuration manager takeover operation occurring in partition $P_1$ since it has the majority of the nodes, and a new node on partition $P_1$ is in the process of being elected as Configuration Manager. The previous configuration manager on node $N_5$ ceases to hand out leases after (at most) one lease period, when it is unable to achieve the lease quorum.

In a second exemplary case, assume that (still using the nomenclature from the first example) $T < T_2 < T_1$. At time $T_2$, partition $P_2$ receives notification of the failure. Even though no Configuration Manager takeover had occurred, the nodes in $P_1$ are, nonetheless, not able to renew their leases (since node $N_5$ is unreachable) and all of the I/O requested operations are queued until a new Configuration Manager is assigned and leases are renewed.

Configuration Manager Takeover

At a given time, each node goes to the Configuration Manager for a lease. There is one Configuration Manager per nodeset. If it fails for any reason, another node takes it place so that the GPFS file system service continues operating uninterrupted as long as a quorum of nodes exists. For safe log recovery, one should also consider the time desired for Configuration Manager failure and recovery so that the recovery is allowed to occur during a Configuration Manager takeover.

Figure 2:
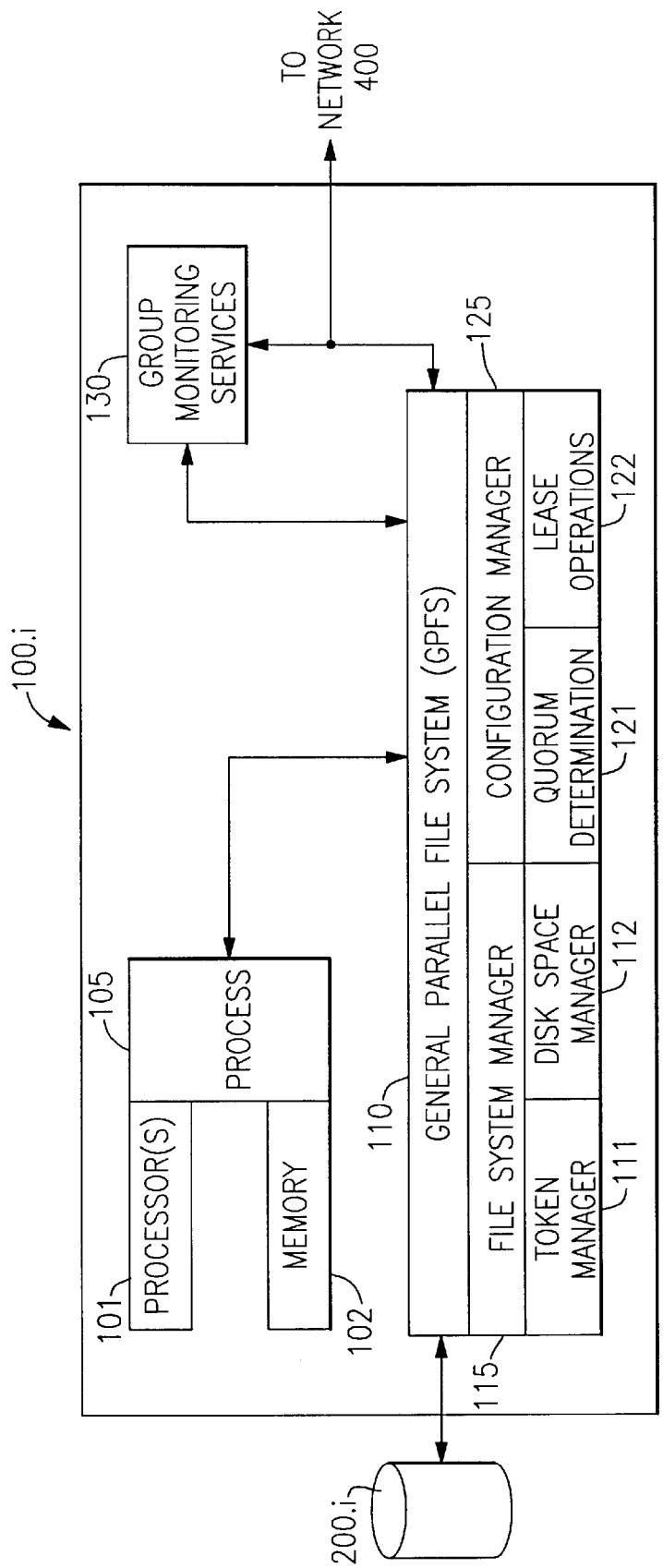
FIG. 2 is a block diagram illustrating the detailed programmatic structure of a data processing node which participates in the operation of the present invention and particularly illustrates the interactions of the various components which operate to provide quorum and leasing functions.

The hardware and programmatic structures described above are also shown in FIG. 2 so as to more particularly illustrate their relationships and interactions. Each node 100.i includes one or more processors 101 and local random access memory 102. Processes 105 running on the node are the basic submitters of requests to read from or to write to files contained on both local and remote disks within the network of interconnected nodes. In addition to reading and writing information, processes 105 are also able to change the structure and organization of data with local and remote files. This includes some metadata as well.

Processes, such as process 105 shown, communicate data requests through General Parallel File System (GPFS) 110 of the computer's operating system. GPFS 110 includes File System Manager 115 and Configuration Manager 125 which provide basic functionality for reading, writing, structuring and managing local files as stored, for example, on disk 200.i or which are available over network 400. Disk 200.i actually represents any convenient, non-volatile storage device, whether magnetic, optical, magneto-optical or other. File System Manager 115 includes Token Manager 111 which performs distributed locking operations. File System Manager 115 also includes Disk Space Manager 112 which serves to match the file structure with physical disk locations. Additionally, GPFS 110 includes Configuration Manager 125 which manages and processes file system metadata, for example.

Configuration Manager 125 operates to perform a number of functions, and in particular, for purposes of the present invention, it includes subfunction 121 which makes quorum determinations, as described above. Configuration Manager 125 also operates to grant and renew lease requests from various running processes via Lease Operations subfunction 122, which also operates as described above. Group Monitoring Services 130 communicates directly over network 400 with other nodes in the system. This service monitors processes on all of the processors and detects processor and communication failures. This service also provides relevant information concerning processor status to File System Manager 115 and to Configuration Manager 125 so that they are able to carry out the lease quorum operations described above.

To more fully appreciate the environment in which the present invention is employed, it is noted that in any collection of nodes, there may be present one or more non-overlapping groups of nodes (also describable as GPFS node sets) that run GPFS. And there is also the possibility that there are nodes in the overall system that do not belong to any of the GPFS node sets. However, the nodes within a GPFS node set work cooperatively to provide a single image of GPFS and file system services. Distinct node sets do not necessary communicate with one another and typically operate in a completely independent fashion.

From the above, it should be appreciated that all of the stated objects are achieved in one or more embodiments of the present invention. It should also be appreciated that the present invention extends the lease concept to log recovery and that the lease quorum concept allows a fully connected SAN file system to continue operation across failures of the lease manager. GPFS shares full control of the file system metadata across all the disks and there is no a single point of failure for the leases, which thus allows application programs running on the various nodes to continue in an uninterrupted fashion.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for controlling access to files in a storage area network which includes a plurality of interconnected data processing nodes when said nodes have been divided into a plurality of distinct partitions as a result of a node failure or network communication failure, said method comprising the steps of:

determining for each partition, $P_1, \ldots, P_n$, the number of nodes, $N_1, \ldots, N_n$, respectively, that constitute a quorum for that partition, and the times, $T_1, \ldots, T_n$, at which said node failure is reported to each of said node sets, also respectively;

granting access to said file to at least one of said nodes for a limited time duration, D, said access grant coming from a node set in which a quorum of nodes concurs with said granting;

accessing said file from said at least one node during times that said permission duration has not expired; and prohibiting access of said file from said failed node until a time at least equal to $\max(T_1, \ldots, T_n)+D$.

2. The method of claim 1 in which said recovery is prohibited until a time at least equal to $T+\max(T_1, \ldots, T_n)+D+M$, where M represents a non-zero safety margin.

3. The method of claim 1 in which said access grant is to a plurality of nodes.

4. The method of claim 1 in which said access grant is to a single node.

5. The method of claim 1 in which said access grant includes permission to modify metadata information for said file.

6. The method of claim 1 further including the step of denying access at the end of said duration, D.

7. An apparatus for controlling access to files, said apparatus comprising:

a plurality of nodes, configured in an interconnected network, said nodes being capable of being divided into a plurality of partitions upon failure of one of said nodes;

a plurality of storage access devices accessible from said nodes, said storage access devices containing data stored thereon in a file structure;

program means for determining, for each node set, $P_1, \ldots, P_n$, the number of nodes, $N_1, \ldots, N_n$, respectively, that constitute a quorum for that node set, and the times, $T_1, \ldots, T_n$, at which said node failure is reported to each of said node sets, also respectively;

program means for granting access to said data to at least one of said nodes for a limited time duration, D, said access grant coming from a node set in which a quorum of nodes concurs with said granting;

program means for accessing said data from said at least one node during times that said permission duration has not expired; and program means for prohibiting access of said data from said failed node until a time at least equal to $T+\max(T_1, \ldots, T_n)+D$.

8. A computer program product stored within or on a machine readable medium containing program means for use in an interconnected network of data processing nodes said program means being operative:

to determine, for each node set, $P_1, \ldots, P_n$, the number of nodes, $N_1, \ldots, N_n$, respectively, that constitute a quorum for that node set, and the times, $T_1, \ldots, T_n$, at which said node failure is reported to each of said node sets, also respectively;

to grant access to said file to at least one of said nodes for a limited time duration, D, said access grant coming from a node set in which a quorum of nodes concurs with said access grant;

to access said file from said at least one node during times that said permission duration has not expired; and to prohibit access of said file from said failed node until a time at least equal to $\max(T_1, \ldots, T_n)+D$.

* * * * *